Nov. 8, 1966  H. F. HUNGER ET AL  3,284,239
BIOCHEMICAL FUEL CELL
Filed June 3, 1963
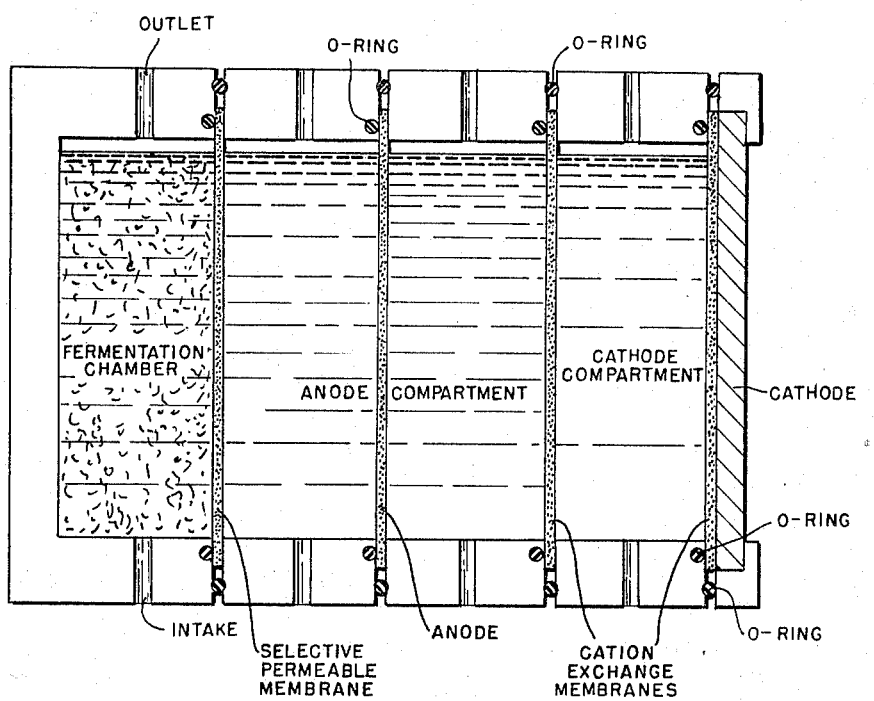
INVENTORS,
HERBERT F. HUNGER
JOHN PERRY JR.

United States Patent Office 3,284,239
Patented Nov. 8, 1966

3,284,239
BIOCHEMICAL FUEL CELL
Herbert F. Hunger, Long Branch, and John Perry, Jr., New Shrewsbury, N.J., assignors to the United States of America as represented by the Secretary of the Army
Filed June 3, 1963, Ser. No. 285,158
1 Claim. (Cl. 136—86)

The invention described herein may be manufactured and used by or for the Government for governmental purposes without the payment of any royalty thereon.

This invention relates to biochemical fuel cells in which a biochemical agent is used to generate an intermediate substance which is more electrochemically active than the starting material; the intermediate substance then being consumed in an electrode process in the conventional manner.

Biochemical fuel cells are electrochemical cells in which one (or both) of the electrode reactions are promoted or catalyzed by biochemical agents. By the term biochemical agent is meant those living cells, cell free extracts, or enzymes that can decompose organic compounds, derived from natural materials, and which are electrochemically relatively unreactive such as sugar, urea, celluloses, starches, or amino acids to lower molecular weight materials which are electrochemically active such as hydrogen, ammonia, methanol, or ethanol.

Biochemical fuel cells utilizing biochemical agents for the anodic oxidation of fuels and the cathodic reduction of oxidants are known. In these cells, the biochemical agents are dissolved or suspended in a nutrient-substrate medium of a conductive nature (fuel-anolyte) or (oxidant-catholyte) and facilitate by their presence the anodic oxidation or cathodic reduction of derived reactants. The term nutrient-substrate medium as used above refers to the food requirement necessary to maintain the metabolic processes of the biochemical agent some products of which are useful fuels or fuel cells. This principle may concern only one half cell of a complete galvanic cell or can be extended to both half cells. In the first case, a proper non-biochemical counter electrode can form the second half cell.

In another type of biochemical fuel cell, the biochemical agents are not suspended in the electrolyte but attached to the electrodes.

A difficulty with the biochemical fuel cells as above described is that the biochemical agent cannot be kept at a steady state of concentration. A further difficulty is that the biochemical agents become inhibited in their biochemical action with time by the accumulation of reaction products. These difficulties create unstable conditions and consequently, unstable power outputs over extended periods of time.

An object of this invention is to provide a biochemical fuel cell in which the aforementioned difficulties are overcome. A further object is to provide a biochemical fuel cell that will be characterized by stable steady state conditions and stable power outputs over extended periods of time.

It has now been found that the aforementioned difficulties can be overcome and the above mentioned objectives attained by providing a diffusion type biochemical fuel cell as hereinafter described.

According to the invention, a multicompartment diffusion type biochemical fuel cell is provided. One of the compartments serves as a fermentation chamber for decomposing the organic compound derived from natural material which is electrochemically relatively unreactive to a lower molecular weight material which is electrochemically active by means of a biochemical agent. This compartment or fermentation chamber is separated by a selective-permeable membrane from a second compartment, or anode compartent, coextensive with the fermentation chamber and containing the anode and anolyte. The selective-permeable membrane permits the diffusion of lower molecular weight material into the anode compartment but hinders the diffusion of organic compound derived from natural material and the biochemical agent into the anode compartment. The selective-permeable membrane may be an ion exchange resin membrane or an organic film. An ion exchange resin membrane separates the anode compartment from a third compartment, or cathode compartment, coextensive with the anode compartment and containing the cathode and catholyte. The ion exchange resin membrane is the conventional commerically available type exchange membrane.

The invention can be best understood by referring to the accompanying drawing in which there is shown a schematic view partially in cross section of a biochemical fuel cell according to the invention.

Referring to the drawing, a fuel cell having three compartments is shown. The compartments are formed structurally from a plastic material, provided with intake and outlet portions, and sealed with O-rings to prevent leakage of the solutions. The compartments can be joined together by bolts, clamps, or other conventional means (not shown) none of which form part of this invention.

The compartment at the left which is designated as the fermentation chamber is filled through its intake portion with a liquid mixture of the organic compound derived from natural material and the biochemical agent. The biochemical agent decomposes the organic compound in steps to a lower molecular weight material which is electrochemically active. The selective-permeable membrane that separates the fermentation chamber from the anode compartment permits the diffusion of the lower molecular weight material from the fermentation chamber into the anode compartment but hinders the diffusion of the organic compound and biochemical agent from the fermentation chamber into the anode compartment. The anode in the anode compartment is made of a material which is capable of dehydrogenating the lower molecular weight material that has diffused through the selective-permeable membrane. The anolyte in the anode compartment should be a liquid solution that will not destroy the biochemical agent in the case of any back diffusion of anolyte into the fermentation chamber. The anolyte is introduced into the anode compartment through the intake portions as shown in the drawing. In the anode compartment, the lower molecular weight material is consumed by electrochemical oxidation at the anode. The oxidation product (e.g. $CO_2$) is vented through the outlet portion of the anode compartment. This consumption of the lower molecular weight material creates a concentration gradient of the lower molecular weight material across the area between the selective-permeable membrane and the anode and thereby facilitates further diffusion of the lower molecular weight material from the fermentation chamber into the anode compartment. Thus, by removal of the lower molecular weight material from the fermentation chamber and by the controlled feeding in of organic compounds derived from natural materials into the fermentation chamber, the material balance between the fermentation chamber and the anode compartment can be substantially maintained. An ion exchange membrane separates the anode compartment from the cathode compartment containing the catholyte and cathode. The catholyte is a buffer salt solution similar to or the same as the anolyte. The cathode within the cathode compartment is an air electrode, as for example an air electrode of platinized carbon. Attached to the surface of the cathode in contact with the catholyte as shown can be a second ion exchange membrane. This ion exchange membrane serves to prevent any biochemical agent or organic compound which may have diffused into the cathode compartment from reaching the cathode and inhibiting the electrochemical reactions there.

*Example 1*

A biochemical fuel cell as shown in the drawing is used, the compartments being made from Lucite plastic. The selective-permeable membrane separating the fermentation chamber from the anode compartment is an organic film of nitrocellulose. The anode of the anode compartment is a platinized platinum screen electrode. A cation exchange resin membrane separates the anode compartment from the cathode compartment. Similarly, a second cation exchange resin membrane is attached to the surface of the cathode in contact with the catholyte; the cathode being a platinized carbon-air electrode. 25 milliliters of a liquid mixture containing 1 milliliter of yeast cells and 24 milliliters of a 5 weight percent glucose solution in a 0.05 M phosphate buffer (pH about 7) is fed through the intake into the fermentation chamber. Phosphate buffer solution with a pH about 7 is fed into the intake portions of the anode compartment and cathode compartment. The above biochemical fuel cell is found to have an open circuit potential of 0.7 to 0.8 volt.

The exact mechanisms of the reactions occurring in the above cell are unknown but the following general statements regarding its operation may be made. In the fermentation chamber, the yeast cells decompose the sugar in a series of steps to ethanol. The selective-permeable membrane permits the diffusion of the ethanol formed from the fermentation chamber into the anode compartment but hinders diffusion of the sugar and the transfer of yeast to the anode compartment. In the anode compartment, the ethanol is consumed by electrochemical oxidation at the anode. The carbon dioxide formed in the reactions is vented out through the outlet portions of the compartments. The consumption of ethanol creates a concentration gradient of the ethanol across the area between the selective-permeable membrane and the anode and facilitates further diffusion of ethanol into the anode compartment. Thus, by removal of the ethanol from the fermentation chamber and the feeding in of additional sugar solution, the material balance between the fermentation chamber and the anode compartment is maintained.

Instead of the sugar glucose shown in Example 1, other oragnic compounds derived from natural materials could be used as for example, starch, cellulose, or sucrose. In addition to the yeast cells shown in Example 1, other biochemical agents may be used as for example, the enzymes amylase and diastase.

The foregoing description is to be considered merely as illustrative and not in limitation of the invention as hereinafter claimed.

What is claimed is:

A multicompartment diffusion type biochemical fuel cell comprising a fermentation chamber for decomposing sugar to ethanol by means of yeast cells, an anode compartment including a platinized platinum screen anode in a phosphate buffer solution having a pH of about 7, said anode compartment being adjacent to said fermentation chamber and separated therefrom by an organic film of nitrocellulose which permits the diffusion of the ethanol into the anode compartment but hinders the diffusion of the sugar and yeast cells into the anode compartment, and a cathode compartment containing a platinized carbon-air electrode as the cathode in a phosphate buffer solution having a pH about 7 as the catholyte, said cathode compartment being adjacent to said anode compartment and separated therefrom by a cation exchange membrane and where said cathode has a second cation exchange resin membrane attached to its surface in contact with the phosphate buffer solution.

References Cited by the Examiner

UNITED STATES PATENTS

| 3,152,015 | 10/1964 | Turell | 136—86 |
| 3,177,097 | 4/1965 | Beals | 136—86 |
| 3,186,917 | 9/1965 | Gerhardt et al. | 195—103.5 X |

OTHER REFERENCES

M. C. Potter, Electrical Effects Accompanying the Decomposition of Organic Compounds In Proc. Royal Soc. London (B Series Biological Papers), volume 84, 3/1962. (Only pages 261–264, 268, 273–276 relied upon.)

S. D. Pursglove, Sophisticated Compost Pile To Power Our Subs, In Science and Mechanics, August 1961, pages 116–117.

WINSTON A. DOUGLAS, *Primary Examiner.*

ALLEN B. CURTIS, *Examiner.*